United States Patent [19]

Umebara et al.

[11] Patent Number: 5,039,051
[45] Date of Patent: Aug. 13, 1991

[54] EQUIPMENT SUPPORTING DEVICE

[75] Inventors: Takao Umebara; Hozumi Suzuki, both of Shizuoka, Japan

[73] Assignee: Tokyo Electric Co., Ltd., Tokyo, Japan

[21] Appl. No.: 526,894

[22] Filed: May 22, 1990

[30] Foreign Application Priority Data

May 24, 1989 [JP] Japan .................. 1-130950

[51] Int. Cl.⁵ .............................. G06K 7/01
[52] U.S. Cl. ...................... 248/284; 186/61; 248/478; 248/396; 248/221.3
[58] Field of Search .......... 186/61; 248/477, 478, 248/396, 279, 397, 291, 284, 221.3, 130; 108/6-8

[56] References Cited

U.S. PATENT DOCUMENTS

| | | | |
|---|---|---|---|
| 836,967 | 11/1906 | Grant | 248/478 X |
| 4,350,098 | 9/1982 | Shirono et al. | 108/6 |
| 4,838,383 | 6/1989 | Saito et al. | 186/59 |
| 4,963,721 | 10/1990 | Kohno et al. | 186/61 X |
| 4,988,851 | 1/1991 | Kohno et al. | 186/61 X |

FOREIGN PATENT DOCUMENTS

| | | |
|---|---|---|
| 63-45665 | 2/1988 | Japan. |
| 63-45666 | 2/1988 | Japan. |
| 19991 | of 1896 | United Kingdom ........ 248/477 |
| 410953 | 5/1934 | United Kingdom ........ 108/8 |

Primary Examiner—David A. Bucci
Assistant Examiner—William M. Hienz
Attorney, Agent, or Firm—Oblon, Spivak, McClelland, Maier & Neustadt

[57] ABSTRACT

An equipment supporting device including a supporting member for rotatably supporting an equipment on its opposite sides through a horizontal pivotal axis; a pair of engaging shafts displaceably mounted directly or indirectly on the opposite sides of the equipment and normally biased outwardly; an operating portion mounted on the equipment and connected to the engaging shafts; a pair of small-diameter portions having a diameter smaller than that of the engaging shafts and extending outwardly from outer ends of the engaging shafts; a pair of guide grooves formed through opposite side portions of the supporting member for retaining the small-diameter portions in such a manner that the small-diameter portions can be moved in a direction perpendicular to an axis thereof; a plurality of engaging recesses formed on opposite side edges of each of the guide grooves and arranged at given intervals, a couple of the engaging recesses being engaged with an outer circumference of each of the engaging shafts; and a pair of sliding members retained on the small-diameter portions and elastically contacting the opposite side portions of the supporting member.

3 Claims, 6 Drawing Sheets 5,039,051

EQUIPMENT SUPPORTING DEVICE

FIELD OF THE INVENTION AND RELATED ART STATEMENT

The present invention relates to an equipment supporting device for supporting an equipment such as a commodity data reading device having a bar code scanner.

FIG. 9 is a perspective view of a known bar code reading device in the prior art. Referring to FIG. 9, a body 102 of a bar code scanner 101 is fixed at a rear position of a substantially central portion of a sacker table 100 on which a shopping basket (not shown) for receiving a commodity is put. A reading window 103 is formed on a front surface of the body 102, and a keyboard 104 is fixed at a top of the body 102. The commodity taken out of the shopping basket located on one side of the sacker table 100 is passed before a front surface of the reading window 103, and is then received into another shopping basket (not shown) located on the other side of the sacker table 100. During the course of this operation, a bar code provided on the commodity is read from the reading window 103 of the bar code scanner 101.

However, there is a variation in height of operators to be engaged in such a reading operation with the bar code reading device. Further, the bar code scanner 101 is fixed in position. Accordingly, there is a case that some operator must adjust an angle of bending of her arm or keep a half-sitting posture, so as to let the commodity face the front surface of the reading window 103. In this case, the operator is obliged to keep an unnatural posture for a long period of time, causing a tendency of operator's fatigue.

OBJECT AND SUMMARY OF THE INVENTION

It is a first object of the present invention to fix an equipment rotatably mounted about a horizontal axis at an arbitrary inclined angle.

It is a second object of the present invention to maintain a torque of the equipment constant irrespective of a change in the inclined angle of the equipment to thereby improve the operability.

It is a third object of the present invention to easily let a reading window of a bar code scanner as an example of the equipment face a commodity.

According to a first aspect of the present invention, there is provided an equipment supporting device comprising a supporting member for rotatably supporting an equipment on its opposite sides through a horizontal pivotal axis; a pair of engaging shafts displaceably mounted directly or indirectly on the opposite sides of said equipment and normally biased outwardly; an operating portion mounted on said equipment and connected to said engaging shafts; a pair of small-diameter portions having a diameter smaller than that of said engaging shafts and extending outwardly from outer ends of said engaging shafts; a pair of guide grooves formed through opposite side portions of said supporting member for retaining said small-diameter portions in such a manner that said small-diameter portions can be moved in a direction perpendicular to an axis thereof; a plurality of engaging recesses formed on opposite side edges of each of said guide grooves and arranged at given intervals, a couple of said engaging recesses being engaged with an outer circumference of each of said engaging shafts; and a pair of sliding members retained on said small-diameter portions and elastically contacting the opposite side portions of said supporting member.

With this arrangement, when the operating portion is operated to inwardly displace the engaging shafts mounted on the equipment against the biasing force and thereby retract the engaging shafts from the engaging recesses of the supporting member, the equipment can be rotated about the horizontal pivotal axis. Next, when the engaging shafts are brought into engagement with any of the engaging recesses, the equipment can be fixed at an arbitrary inclined position. Further, in the case that the equipment is a bar code scanner, an inclined angle of the bar code scanner can be adjusted according to a height of a commodity taken by an operator, and a reading window of the bar code scanner can be easily let face the commodity. Further, when an operating force is removed from the operating portion, the engaging shafts can be quickly returned by the biasing force to engage the engaging recesses, thereby preventing excess rotation of the equipment due to its dead weight.

According to a second aspect of the present invention, the equipment supporting device as mentioned above further comprises a pair of levers pivotably mounted on said equipment at opposite side portions thereof in such a manner as to be pivotable about respective vertical axes, and a pair of connecting members for retaining inner ends of said engaging shafts, said connecting members being pivotably connected to said levers in such a manner as to be pivotable about a horizontal axis, wherein each of said guide grooves is inclined at a given angle with respect to an arc defined about said horizontal pivotal axis of said equipment. With this arrangement, when the operating portion is operated to rotate the levers and thereby retract the engaging shafts from the engaging recesses, the connecting members are rotated about the horizontal axes relative to the levers by the rotation of the equipment. Accordingly, a distance from the horizontal pivotal axis of each lever to a center of the corresponding engaging shaft is increased with an increase in the inclined angle of the equipment. As a result, a moment of each lever as a product of the above distance and a press-contact force of each sliding member against the supporting member can be increased to thereby increase a sliding resistance of each sliding member against the supporting member. Thus, the more the equipment is inclined, the more the resistance against the rotation of the equipment is increased, thereby preventing excess rotation of the equipment due to its dead weight.

Other objects and features of the invention will be more fully understood from the following detailed description and appended claims when taken with the accompanying drawings.

DETAILED DESCRIPTION OF THE PREFERRED EMBODIMENTS

Figure 6:
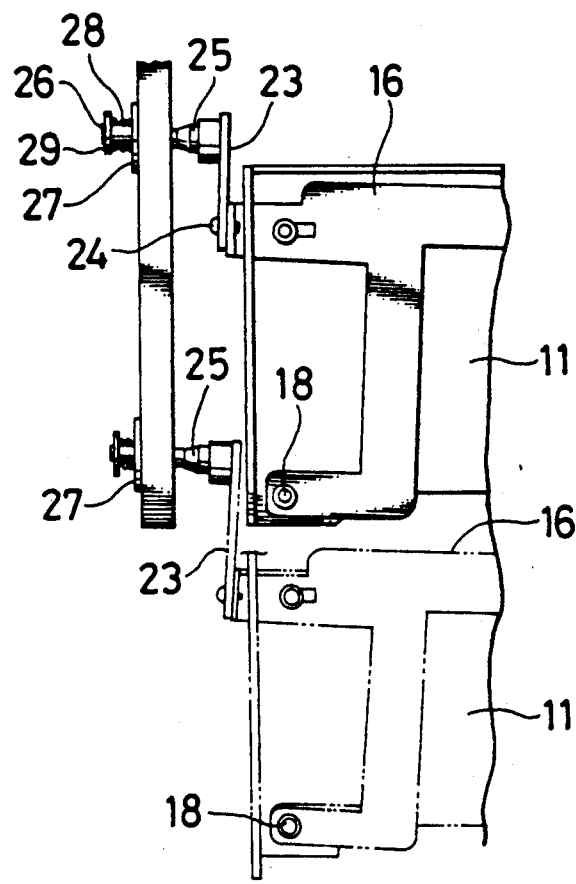
FIG. 6 is a top plan view of a left half of the mounting member.
Figure 7:
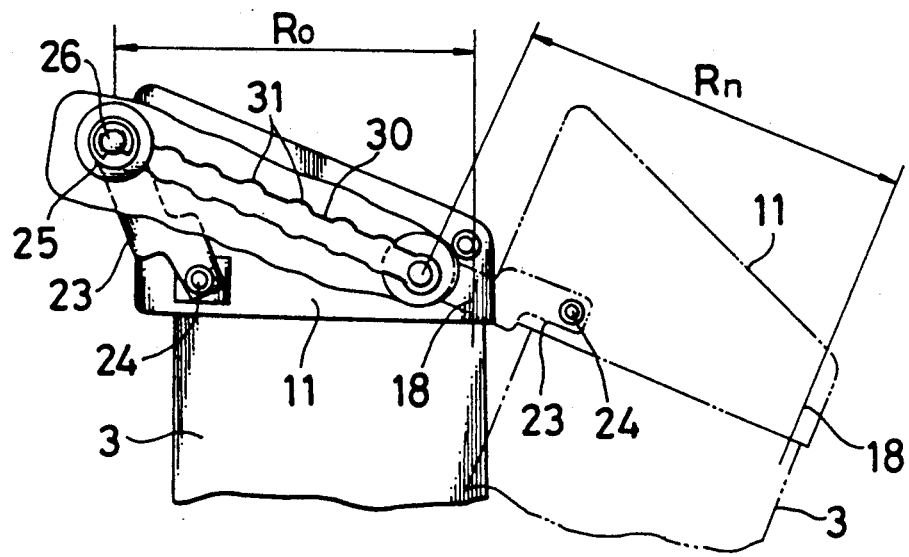
FIG. 7 is a left side view of a part of the bar code scanner, showing a pivotal motion thereof.
Figure 8:
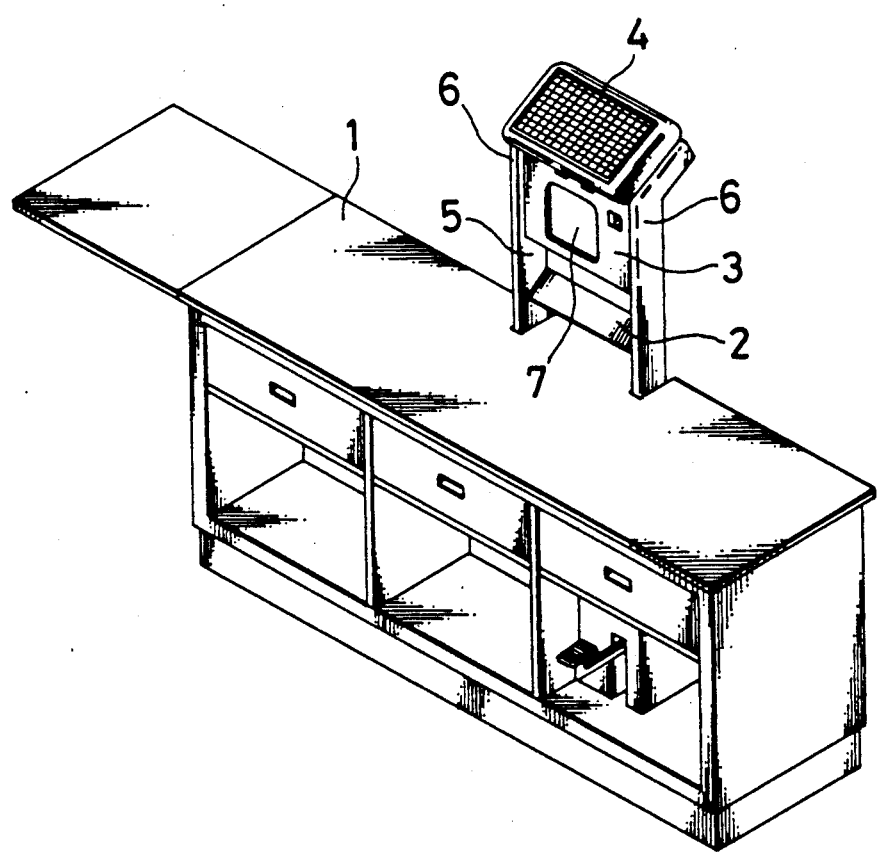
FIG. 8 is a perspective view of the preferred embodiment in connection with an associated part.
Figure 9:
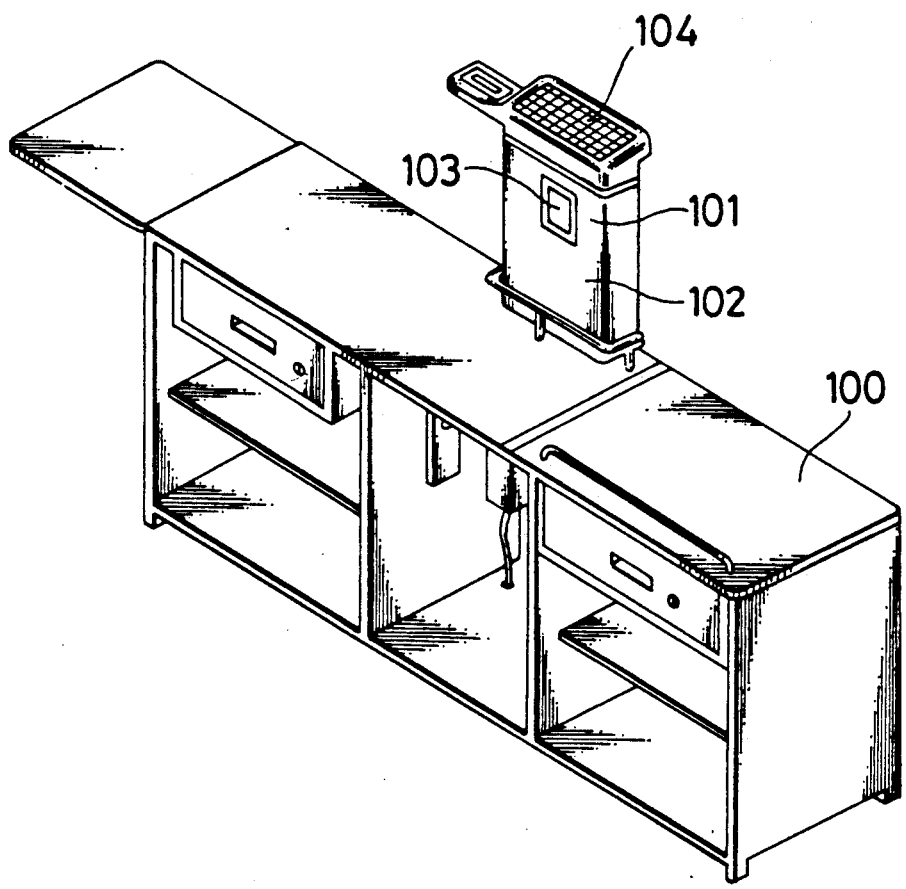
FIG. 9 is a perspective view of the prior art.

There will now be described a preferred embodiment of the present invention with reference to FIGS. 1 to 8. Referring to FIG. 8, a supporting member 5 for supporting a display 2, a bar code scanner 3 as an equipment according to the present invention and a keyboard 4 all facing an operator is provided at a rear position of a central portion of a sacker table 1. The supporting member 5 has a pair of right and left posts 6 connected together under the sacker table 1. A reading window 7 is formed on a front surface of the bar code scanner 3.

Figure 3:
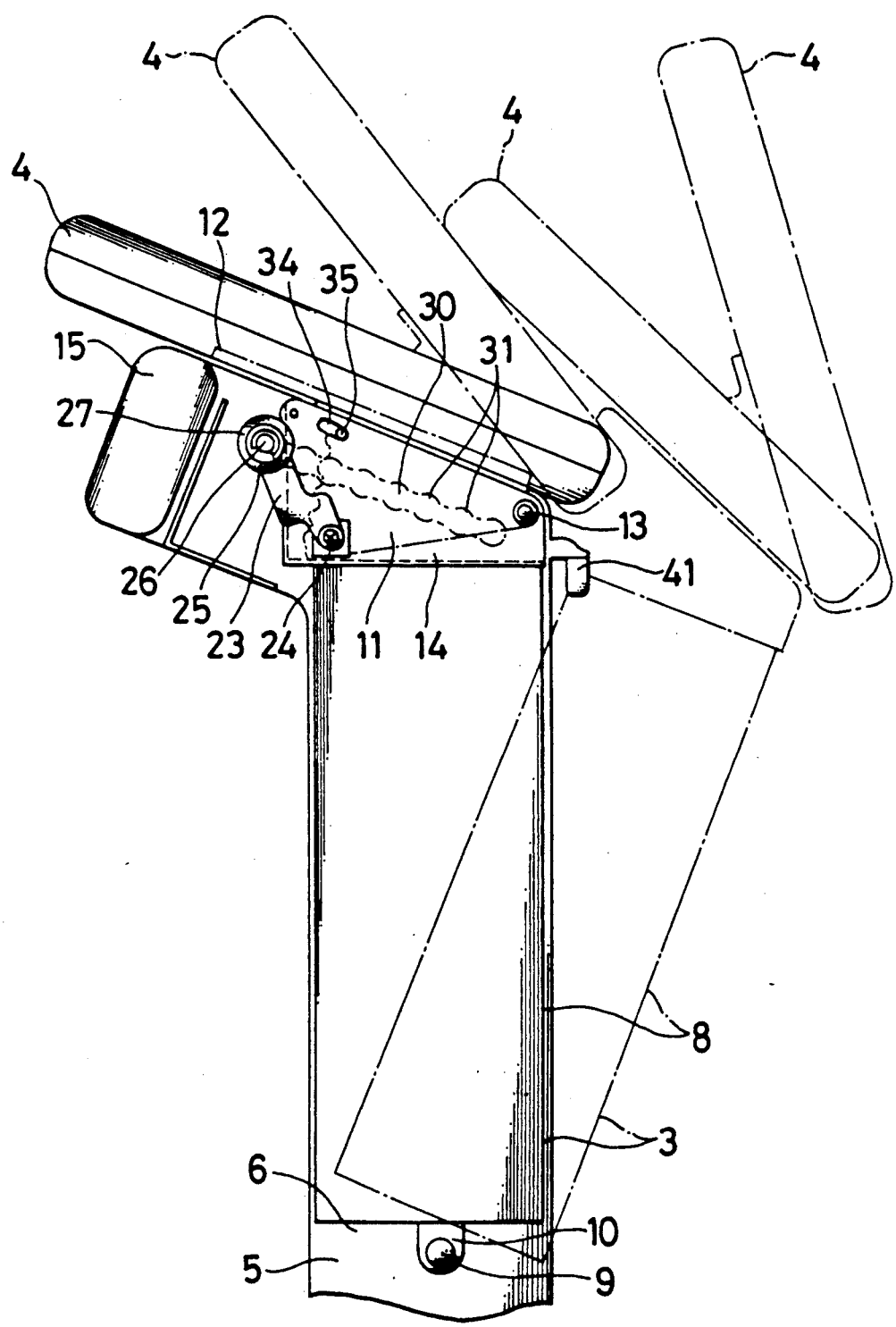
FIG. 3 is a left side view of the preferred embodiment with a left post of the supporting member omitted.

Referring to FIG. 3 which is a left side view of the preferred embodiment with the left post 6 omitted, a housing 8 of the bar code scanner 3 is formed at its opposite side lower ends with a pair of downward projections 10, and a pair of pivotal shafts 9 having a horizontal axis for pivotally supporting the downward projections 10 are fixed to the right and left posts 6. The housing 8 is provided at its upper end with a mounting member 11 for pivotally supporting the keyboard 4. The keyboard 4 is provided at its lower surface with a base 12. A pair of right and left side portions 32 of the base 12 are pivotally supported at their front ends to a pair of right and left side portions 14 of the mounting member 11 by means of a pair of horizontal pivotal shafts 13. Another display 15 facing a customer is mounted on a rear surface of an upper portion of the supporting member 5.

Figure 4:
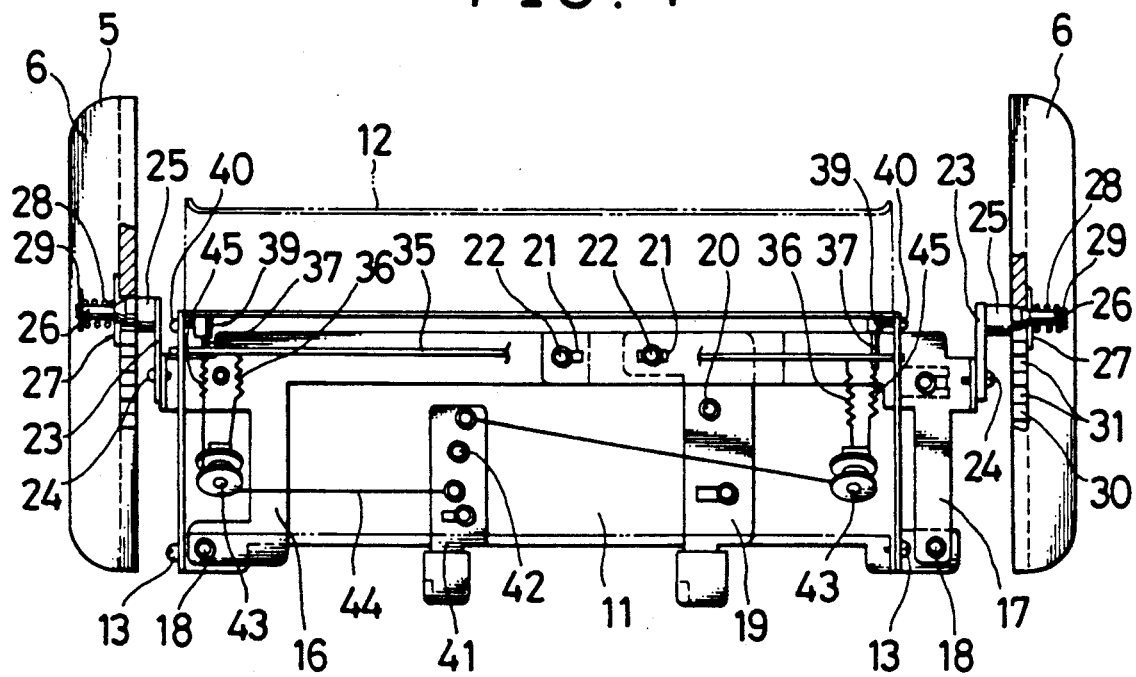
FIG. 4 is a top plan view of the supporting member and the mounting member.
Figure 5:
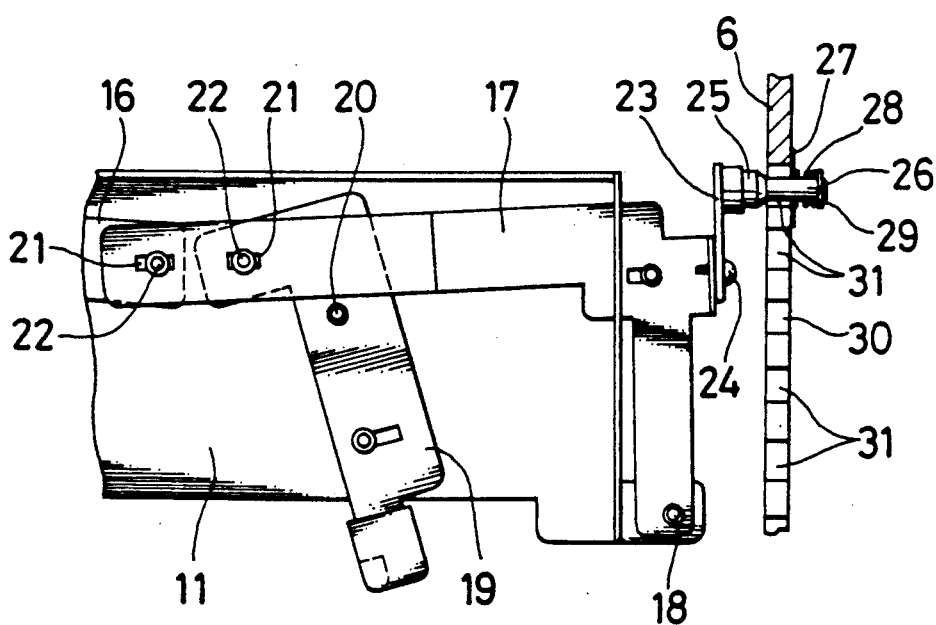
FIG. 5 is a top plan view of a right half of the mounting member.

Referring to FIG. 4 which is a top plan view of the supporting member 5 and the mounting member 11, a pair of right and left levers 17 and 16 having a substantially L-shaped configuration are pivotally supported to the mounting member 11 by means of a pair of pivotal shafts 18 having a vertical axis, and a first operating lever 19 as the operating portion according to the present invention is pivotally supported to the mounting member 11 by means of a pivotal shaft 20 having a vertical axis. The levers 16 and 17 are interlockably connected together at their inner end portions by means of an elongated hole 21 and a pin 22, and the right lever 17 and the first operating lever 19 are also interlockably connected together by means of an elongated hole 21 and a pin 22. A pair of plate-like connecting members 23 are pivotally mounted at their one end portions to outer ends of the levers 16 and 17 by means of a pair of horizontal pivotal shafts 24 in such a manner as to be pivotable on vertical planes. A pair of engaging shafts 25 are mounted on the other end portions (pivotal ends) of the connecting members 23 in such a manner as to project sideward in opposite directions. The engaging shafts 25 are integrally formed at their outer ends with respective small-diameter portions 26 through tapering portions. A pair of disk-like sliding members 27 contacting the outer side surfaces of the right and left posts 6 and a pair of springs 28 are engaged with the small-diameter portions 26, and a pair of stop rings 29 are fixed at the outer ends of the small-diameter portions 26. The right and left posts 6 are formed with respective guide grooves 30 for slidably guiding the small-diameter portions 26 in a direction perpendicular to the axis thereof. Each guide groove 30 is formed at its upper and lower edges with a plurality of engaging recesses 31 arranged at given intervals and adapted to be selectively engaged with the corresponding engaging shaft 25. Each guide groove 30 is inclined upwardly toward the rear side of the posts 6 at a given angle with respect to an arc to be defined about the pivotal center (each pivotal shaft 9) of the bar code scanner 3.

Figure 1:
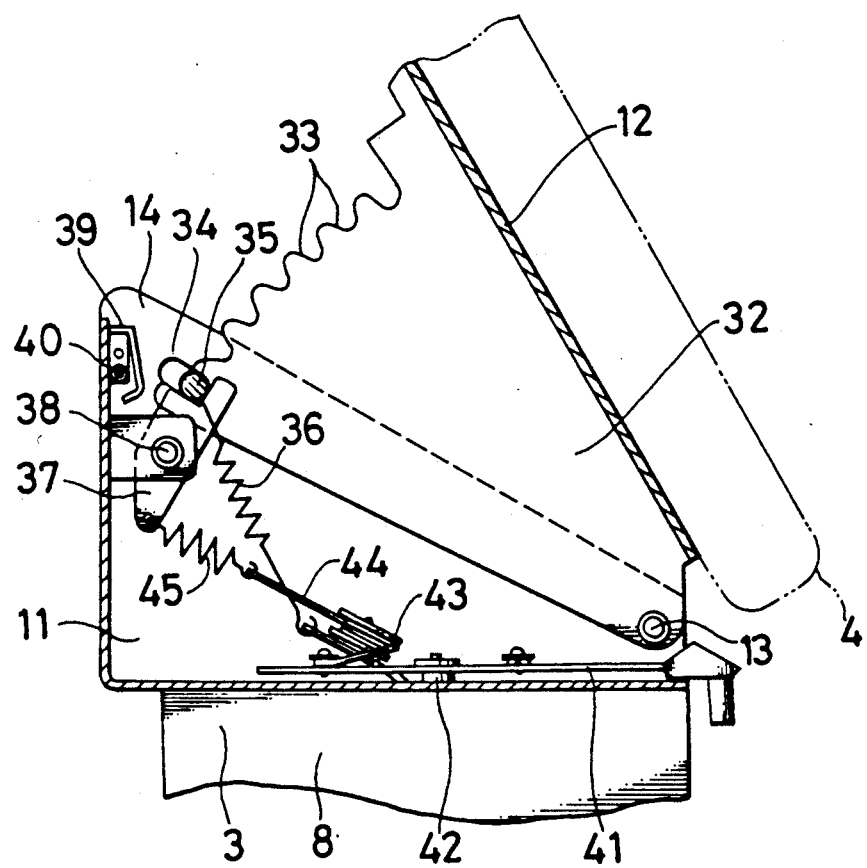
FIG. 1 is a vertical sectional side view of a supporting structure of the keyboard according to a preferred embodiment of the present invention.

Referring next to FIG. 1 which is a vertical sectional side view of the mounting structure of the base 12 of the keyboard 4 to the mounting member 11 of the bar code scanner 3, the right and left side portions 32 of the base 12 are formed with a plurality of engaging portions 33 arranged zigzag along an arc defined about each pivotal shaft 13. On the other hand, the right and left side portions 14 of the mounting member 11 are formed with a pair of elongated holes 34. Each elongated hole 34 is long in a radial direction of the arc defined about the pivotal shaft 13. A single engaging bar 35 engaging any one of the engaging portions 33 is retained at its opposite ends to the elongated holes 34. A pair of springs 36 are engaged under tension with the opposite ends of the engaging bar 35 and the mounting member 11, thereby elastically engaging the engaging bar 35 with the engaging portion 33. Further, a pair of release levers 37 contacting the engaging bar 35 are pivotally supported through a pair of pivotal shafts 38 to the right and left side portions 14 of the mounting member 11, and a pair of stoppers 39 facing the rear surfaces of the release levers 37 are pivotally supported through a pair of pivotal shafts 40 to the rear surface of the mounting member 11 in such a manner that a position of each stopper 39 in a direction of rotation about the corresponding pivotal shaft 40 can be adjusted to be fixed. Further, a second operating lever 41 is pivotally supported through a pivotal shaft 42 to the bottom portion of the mounting member 11, and a pair of pulleys 43 are rotatably mounted on the bottom portion of the mounting member 11 at opposite positions with respect to the second operating lever 41. As shown in FIGS. 3 and 4, two wires 44 are fixedly connected at each one end to the second operating lever 41 at opposite positions with respect to the pivotal shaft 42, and are wrapped around the pulleys 43. The other ends of the two wires 44 are connected through a pair of springs 45 to the release levers 37. The springs 45 have a spring constant greater than that of the springs 36.

In the condition shown in FIG. 4, as each engaging shaft 25 is engaged with one of the engaging recesses 31 of the corresponding guide groove 30, the pivotal motion of the bar code scanner 3 is inhibited. When the first operating lever 19 is rotated counterclockwise about the pivotal shaft 20 from the above condition, the right lever 17 is rotated counterclockwise about the right pivotal shaft 18 by the interlocking connection with the first operating lever 19, thereby retracting the right engaging shaft 25 from the right engaging recess 31. At the same time, the left lever 16 is rotated clockwise about the left pivotal shaft 18 by the interlocking connection with the right lever 17, thereby retracting the left engaging shaft 25 from the left engaging recess 31. Under the condition, the bar code scanner 3 can be rotated about the pivotal shafts 9 as shown in FIG. 3. In this condition, the sliding members 27 engaging the small-diameter portions 26 of the engaging shafts 25 are press-contacted with the outer side surfaces of the posts 6 by the pressure of the springs 28, so that an axial displacement of the engaging shafts 25 may be limited. Accordingly, when an operator's hand is released from the first operating lever 19, the engaging shafts 25 are returned by the biasing force of the springs 28 to quickly engage a selected one of the engaging recesses 31. Therefore, excess rotation of the bar code scanner 3 due to its dead weight can be prevented.

As mentioned above, the bar code scanner 3 can be rotated to a desired position, thereby properly directing the reading window 7 of the bar code scanner 3 to a bar code of a commodity even when a height of the commodity taken by an operator varies with a difference in height of operators. Accordingly, any operators can read the commodity data in a natural posture irrespective of a difference in height of the operators, thereby reducing a fatigue of the operators even after working for a long period of time.

Although the engaging shafts 25 are connected through the connecting members 23 to the levers 16 and 17 in the above preferred embodiment, the engaging shafts 25 may be connected directly to the levers 16 and 17. In this case, since the engaging shafts 25 are moved along the arc defined about the pivotal shafts 9, the guide grooves 30 are so formed as to conform with this arc.

The more the bar code scanner 3 is inclined, the more the center of gravity of the bar code scanner 3 is moved away from a vertical line passing through the pivotal shafts 9, with the result that a moment of the bar code scanner 3 due to the dead weight is increased. When the bar code scanner 3 is inclined frontward as shown in FIGS. 6 and 7, the mounting member 11 is moved frontward together with the levers 16 and 17, and the engaging shafts 25 are also moved to a front one of the engaging recesses 31. At this time, since the guide grooves 30 are inclined upwardly toward the rear side of the mounting member 11 at a given angle with respect to the arc defined about the pivotal shafts 9 as a locus of rotation of the bar code scanner 3, the connecting members 23 are rotated about the pivotal shafts 24, and are laid relative to the levers 16 and 17 as shown in FIG. 7. As a result, a distance between the pivotal center of each lever 16 (17) (the axis of the pivotal shaft 18) and the center of each engaging shaft 25 as viewed in parallel to the bottom surface of the mounting member 11 is increased from $R_O$ to $R_n$ ($R_O < R_n$), where $R_O$ represents the distance when the bar code scanner 3 is in a vertical position as shown by a solid line in FIG. 7, and $R_n$ represents the distance when the bar code scanner 3 is in a most-inclined position as shown by a phantom line in FIG. 7. That is, a leverage of the lever 16 (17) corresponding to the distance $R_O$ in the vertical position is increased to a leverage of the lever 16 (17) corresponding to the distance $R_n$ in the most-inclined position. Accordingly, assuming that a rotative angle of the first operating lever 19 is fixed, a retraction amount of each engaging shaft 25 is increased from the vertical position to the most-inclined position. As a result, a deflection amount (a compression amount) of each spring 28 is increased from the vertical position to the most-inclined position, thereby increasing a press-contact force of each sliding member 27 against the outer surface of the corresponding post 6. As a result, a sliding resistance of each sliding member 27 against the corresponding post 6 is increased in proportion to an increase in the press-contact force. Thus, the more the bar code scanner 3 is inclined, that is, as the moment of the bar code scanner 3 is increased, the sliding resistance of each sliding member 27 against the corresponding post 6 can be increased in proportion to such an increase in the moment of the bar code scanner 3 due to its dead weight. Therefore, excess rotation of the bar code scanner 3 due to its dead weight can be prevented.

Next, the adjustment of an inclined angle of the keyboard 4 itself will now be described. As shown in FIG. 1, the engaging bar 35 is elastically engaged with one of the engaging portions 33 of the base 12, and the keyboard 4 with the base 12 is accordingly maintained in a desired inclined position. When the second operating lever 41 is rotated counterclockwise as viewed in FIG. 4 about the pivotal shaft 42 from the above condition, the two wires 44 are drawn inside to rotate the release levers 37 in a counterclockwise direction as viewed in FIG. 1 about the pivotal shafts 38. As a result, the engaging bar 35 is urged by the release levers 37, thus permitting the keyboard 4 with the base 12 to be rotated about the pivotal shafts 13. At this time, when the release levers 37 are rotated at a predetermined angle, they come into abutment against the corresponding stoppers 39. Under the condition, the engaging bar 35 is not completely released from the engaging portion 33. However, when a torque is applied to the base 12 under the condition, the engaging bar 35 is forcibly urged by the engaging portion 33 to permit rotation of the base 12. Thus, a given braking force is applied to the base 12 during rotation, thereby preventing excess rotation of the keyboard 4. Further, when the second operating lever 41 is rotated at a large angle to largely rotate the release levers 37, the release levers 37 come into contact with the stoppers 39 and then deflect the same to further rotate. However, a rotative angle of the release levers 37 is limited by the position of the stoppers 39. Further, variations in a displacement of the second operating lever 41 and a length of the wires 44 can be absorbed by a flexural operation of the springs 45.

Figure 2:
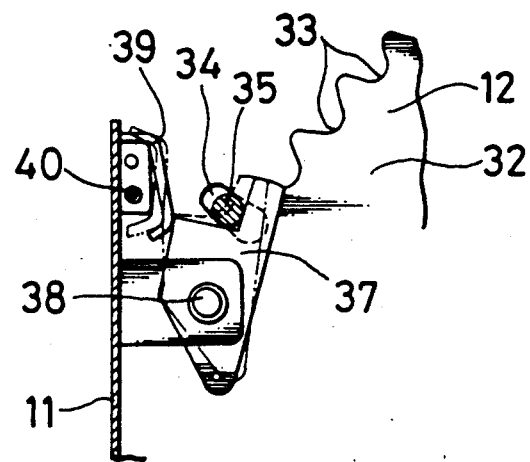
FIG. 2 is an enlarged view of a part of FIG. 1, showing a position adjusting operation of the stopper.

Further, since the engaging bar 35 is not completely released from the engaging portion 33 by the stoppers 39 in a normal rotative condition of the release levers 37, an excess rotation of the release levers 37 can be restricted by the stoppers 39. Accordingly, when the operator's hand is released from the second operating lever 41, the engaging bar 35 is returned by the return force of the springs 36 to quickly engage one of the engaging portions 33. At the same time, the returning operation of the release levers 37 is assisted by the abutting force of the engaging bar 35 due to the biasing force of the springs 36, thereby effecting a quick returning operation of the release levers 37. Accordingly, an excess rotation of the base 12 and the keyboard 4 due to inertia can be prevented. Furthermore, as shown in FIG. 2, the position of the stoppers 39 adapted to contact the release levers 37 can be adjusted in the rotational direction about the pivotal shafts 40. Accordingly, the permissible rotative angle of the release levers 37 and the displacement of the engaging bar 35 can be finely adjusted. Moreover, by providing an elasticity to the contacting portion of each stopper 39 contacting the corresponding release lever 37, a pressure due to this elasticity can be applied to each release lever 37, thereby adjusting an operational force of the second operating lever 41.

As mentioned above, the keyboard 4 can be rotated to a desired angle independently of the rotation of the bar code scanner 3. Accordingly, in the case of using the keyboard 4 under the circumstances where the bar code on the commodity is stained or broken, or no bar code is provided on the commodity, the inclined angle of the keyboard 4 may be adjusted to an arbitrary angle according to the height of the operator. Thus, the operator can input the commodity data by using the keyboard 4 in a natural comfortable posture.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An equipment supporting device comprising:
   a supporting member, having a horizontal pivotal axis, for rotatably supporting equipment between opposite sides of said supporting member;
   a pair of engaging shafts displaceably mounted respectively at opposite sides of the equipment each engaging shaft being biased outwardly from the equipment;
   an operating portion for mounting on said equipment and connected to said engaging shaft;
   a pair of small-diameter portions having a diameter smaller than that of said engaging shafts and extending from outer ends of said engaging shafts towards said supporting member;
   a guide groove formed at each opposite side of said supporting member for retaining a respective one of said pair of small-diameter portions in such a manner that said small-diameter portions can be moved in a direction perpendicular to an axis thereof;
   a plurality of engaging recesses formed on opposite side edges of each of said guide grooves and arranged at given intervals, each of said engaging recesses being provided to engage with an outer circumference of a respective one of said engaging shafts;
   sliding members respectively retained on each of said small-diameter portions; and
   resilient means, positioned outwardly from said opposite sides, for urging each of the sliding members into contact with a respective one of the opposite sides of said supporting member.

2. The equipment supporting device as defined in claim 1, further comprising a pair of levers pivotably mounted at said equipment at opposite side portions of said equipment in such a manner as to be pivotable about respective vertical axes, and a pair of connecting members for retaining inner ends of said engaging shafts, said connecting members being pivotably connected to said levers in such a manner as to be pivotable about a horizontal axis, wherein each of said guide grooves substantially forms an arc about said horizontal pivotal axis of said equipment.

3. The equipment supporting device as defined in claim 1, wherein said equipment comprises a bar code scanner.

* * * * *